United States Patent [19]
Basehore et al.

[11] Patent Number: 5,272,657
[45] Date of Patent: Dec. 21, 1993

[54] FUZZY PATTERN COMPARATOR HAVING AUTOMATIC UPDATE THRESHOLD FUNCTION

[75] Inventors: Paul M. Basehore, Sanford; Thomas M. Trocine, Apopka, both of Fla.

[73] Assignee: American NeuraLogix, Inc., Sanford, Fla.

[21] Appl. No.: 735,518

[22] Filed: Jul. 26, 1991

[51] Int. Cl.$^5$ .................. G06F 15/336; G06F 7/02; G06K 9/68

[52] U.S. Cl. .................. 364/728.03; 395/21; 340/146.2; 382/34

[58] Field of Search .......... 364/715.06, 728.03, 364/715.01; 395/3, 21; 340/146.2; 382/30, 34

[56] References Cited

U.S. PATENT DOCUMENTS

| | | | |
|---|---|---|---|
| 4,361,896 | 11/1982 | Garner | 340/146.2 |
| 4,479,236 | 10/1984 | Sakoe | 382/34 |
| 4,767,949 | 8/1988 | Mayweather, III | 340/146.2 |
| 5,109,523 | 4/1992 | Kanada et al. | 364/728.03 |

Primary Examiner—Long T. Nguyen
Attorney, Agent, or Firm—Cushman, Darby & Cushman

[57] ABSTRACT

An apparatus and method for automatically updating a threshold in a fuzzy pattern comparator. A bit-field of an input data is simultaneously compared to simultaneously-input data patterns. An accumulated distance value is obtained for each data pattern, and the accumulated distance values are simultaneously compared with each other and a threshold to determine a minimum. The comparison is performed by a multipath feed-forward network which starts with the most significant bit and determines on a bit-by-bit basis and identifies which of the accumulated distance values and the threshold are a minimum. The threshold value is automatically updated to the minimum value during the comparison process if it is determined the threshold value is not a minimum. The automatic update threshold function is effective in pattern recognition systems which require periodic adaptation or adjustment in response to slowly changing pattern conditions.

55 Claims, 10 Drawing Sheets

FUZZY PATTERN COMPARATOR HAVING AUTOMATIC UPDATE THRESHOLD FUNCTION

BACKGROUND OF THE INVENTION

1. Field of the Invention

The present invention relates to pattern comparators designed to perform parallel pattern comparisons on real-time data.

2. Description of the Related Art

Pattern comparators have been developed which use fuzzy logic and parallel processing to perform pattern comparisons on multiple real-time data streams in parallel. Such pattern comparators are effective in applications where inaccurate or noisy data may be present. Such applications include recognition systems (for example, object, character, voice, fingerprint, currency, etc.), security and remote surveillance, CAM (computer-aided manufacturing) systems, robotic control systems and rapid data base search/retrieval systems.

It was recognized that pattern comparators could be implemented using fuzzy logic, developed by L. Zadeh in 1963. Rather than evaluating the two values "TRUE" and "FALSE" as in digital logic, fuzzy terms admit to degrees of membership in multiple sets so that fuzzy rules may have a continuous, rather than stepwise, range of truth of possibility. For example, in applying fuzzy logic, a person need not strictly be included or excluded as a member from a set of "tall persons"; rather, to the extent a person may be "tall" to a greater or lesser degree, the member is assigned to the set with a degree of membership between the values of "1" and "0".

A pattern comparator implementing fuzzy logic was developed by Micro Devices, Lake Mary, Fla., known as the MD1210A Fuzzy Set Comparator. The MD1210A functionally had an implementation resembling the block diagram shown in FIG. 1. FIG. 1 shows a pattern comparator 10 which compares serial input data to stored patterns of data in real time. The pattern comparator 10 receives serial input data (SERIAL DATA IN) least-significant-bit first and latches the data by each bit-field into a flip-flop 12 on the falling edge of a CLOCK signal. A bit-field is defined as a stream of data bits up to eight bits, the last bit being the most significant bit. The bit-field is output to an array of magnitude comparators 14 which compare the bit-field with a plurality of predetermined pattern data (PATTERN DATA 0-7). The pattern data may be stored, for example, in external memory such as Pattern RAM (not shown). The magnitude comparators perform the pattern comparison either by Hamming or Linear Distance metrics, selectable by the user.

The comparison of the bit-field with each of the input pattern data 0-7 in the corresponding magnitude comparator 14 results in a corresponding error, or distance value, between the bit-field and the corresponding pattern data. This distance value represents how "far" the pattern data is from the bit-field, for example a distance value of zero (0) indicates that the pattern data and the bit-field are an exact match.

The distance value for each pattern data 0-7 is stored and accumulated in an accumulator 16. The comparison is repeated a predetermined number of times, one bit-field at a time, with the pattern data stored in the external pattern memories, and the resulting distance values are accumulated in the accumulators 16.

After the comparison for the bit-fields has been performed the predetermined number of times, each accumulator contains a sixteen bit accumulated distance value for the corresponding pattern data. The accumulated distance values for the corresponding pattern data are input to a neural network 18. The neural network 18 compares the set of accumulation of distance values to determine the minimum accumulated distance value. The accumulated distance values are also compared to a predetermined threshold value, representing the acceptable degree of fuzziness permitted. In other words, if the pattern data must have a sufficient degree of correlation to the bit-field to constitute an acceptable recognition, the threshold value defines the maximum distance value permitted. The comparison to the threshold (not shown in FIG. 1) can be made either before each of the accumulated distance values are compared, or after a minimum accumulated distance value is determined. If the minimum accumulated distance value is also less than the predetermined threshold, then a best match is deemed found between the bit-field of the input serial data and the stored pattern data. The pattern data from the pattern data set 0-7 having the best match is identified by the output WINNER, and the minimum accumulated distance value which corresponds to the pattern data deemed a best match is output to an EBUS OUT terminal to compete with any other pattern comparator devices coupled to an expansion bus (not shown).

As shown above, the pattern comparators use a predetermined threshold to determine the acceptable degree of fuzziness permitted, e.g., the maximum distance value permitted. Although this design is acceptable for character recognition in a static environment, it is unacceptable in a dynamic environment because patterns may be changing in real time.

Specifically, it is desirable to maintain image recognition performance even when a background of the image may be changing over time. For example, it is desirable to be able to track a missile while the background of the missile changes due to sun, clouds, etc.; also, it is desirable in surveillance applications that humans can be detected while discriminating them from animals over different light and weather conditions. Although one could attempt to compensate for changes over time by providing successive modifications of reference patterns, such modifications could eventually result in erroneous detections.

Finally, in applications where one is unable to determine an adequate threshold, it is desirable to have a system where the threshold can be automatically determined and then automatically updated depending on the input conditions.

The MD1210A by Micro Devices also had a neural network 18 which performed rapid comparison of the accumulated distance values. Highly parallel architectures which perform faster processing speeds were proposed by Lippman (1987). However, the relatively large number of parallel connections in the neural net increases the size of an IC chip, and thus increases the overall cost of the system.

It would be desirable to provide a neural network-type arrangement which was specifically implemented for pattern recognition. Specifically, it would be advantageous to not only use the neural network-type arrangement to quickly determine the minimum accumulated distance value, but also to quickly identify during the pattern comparison which of the pattern data are likely candidates as the best match to the input bit-field. In addition, if multiple pattern comparators are coupled to an expansion bus to increase pattern comparisons, it would be desirable for each neural network to be able to increase processing speed by disengaging pattern comparators deemed not to be candidates to provide the best fit pattern data. Finally, it would be desirable if the neural network-type arrangement was implemented to minimize the amount of area used on an IC chip, thereby minimizing the overall cost of the IC chip.

SUMMARY OF THE INVENTION

It is an object of the present invention to provide a low cost pattern comparator using fuzzy logic which is capable of automatically determining and updating a threshold value representing the acceptable degree of fuzziness permitted in comparing input data patterns to stored pattern data.

It is a further object of the present invention to provide a neural network-type arrangement which is optimized for speed and low-cost implementation to identify a best match between input data patterns and stored pattern data.

In order to achieve these and other objects, a low-cost and efficient pattern comparator is disclosed which performs parallel pattern comparisons on multiple real-time data. A bit-field of an input data pattern is simultaneously compared to simultaneously-input data patterns. The comparison result, or distance value, for each data pattern is stored and accumulated over time to obtain an accumulated distance value for each data pattern. The accumulated distance values for all of the stored data patterns are then simultaneously compared between themselves and also with a threshold value in a multipath feedforward network to determine a best match between the input data and the pattern data while simultaneously rejecting the data patterns which do not qualify as candidates for a best match. If the multipath feedforward network identifies an optimum accumulated distance value which is inconsistent with the threshold value in finding a best match, for example, the optimum accumulated distance value is greater than the threshold, then the threshold value is updated to equal the optimum accumulated distance value.

The function of updating the threshold value to equal the optimum accumulated distance value by the pattern comparator of the present invention is defined as the automatic update threshold function. The optimum accumulated distance value may either be a minimum accumulated distance value or a maximum accumulated distance value, depending on the application of the pattern comparator. The automatic update threshold function is particularly effective for performing pattern comparisons on inaccurate or noisy real-time data. The automatic update threshold function can automatically determine the optimal initial threshold value on the basis of the pattern data and the bit-field of the serial input data. In addition, the automatic update threshold function can adjust the stored threshold on the basis of the pattern data and the input data pattern. As a result, the automatic update threshold function not only frees the user from determining an optimal threshold value, but also corrects the threshold as required based on varying input data patterns. Thus, the automatic update threshold function is particularly effective in systems which require periodic adaptation or adjustment in response to slowly changing conditions.

The pattern comparator also includes a neural network-type multipath feedforward network which is arranged for high processing speed and low-cost implementation. The multipath feedforward network is designed to quickly identify candidates to provide best match pattern data and to reject pattern data which are not candidates to provide the best match pattern data. In addition, if the pattern comparator is arranged to operate simultaneously with a plurality of similar pattern comparator devices on an expansion bus, the multipath feedforward network of the pattern comparator is designed to quickly identify whether the best candidate of the given pattern comparator device remains a candidate with respect to the other devices on the expansion bus. By eliminating both pattern comparator devices and pattern data which are not candidates to provide the best match pattern data, the multipath network enables rapid processing to simultaneously determine the optimum accumulated distance value, the identity of the corresponding pattern data providing the optimum accumulated distance value, the pattern comparator device associated with the pattern data, and whether the threshold needs to be updated.

In addition, the dedicated multipath feedforward network can be designed for minimum use of silicon on a semiconductor chip, resulting in a lower cost for the semiconductor chip.

The features of the present invention will become more readily apparent from the below detailed description and the accompanying drawings.

BRIEF DESCRIPTION OF THE DRAWINGS

Reference is made to the attached drawings, wherein elements having the same reference numeral designations represent like elements throughout, and wherein.

DETAILED DESCRIPTION OF THE PREFERRED EMBODIMENT

The preferred embodiment of the present invention will now be described with reference to the accompanying drawings.

Figure 1:
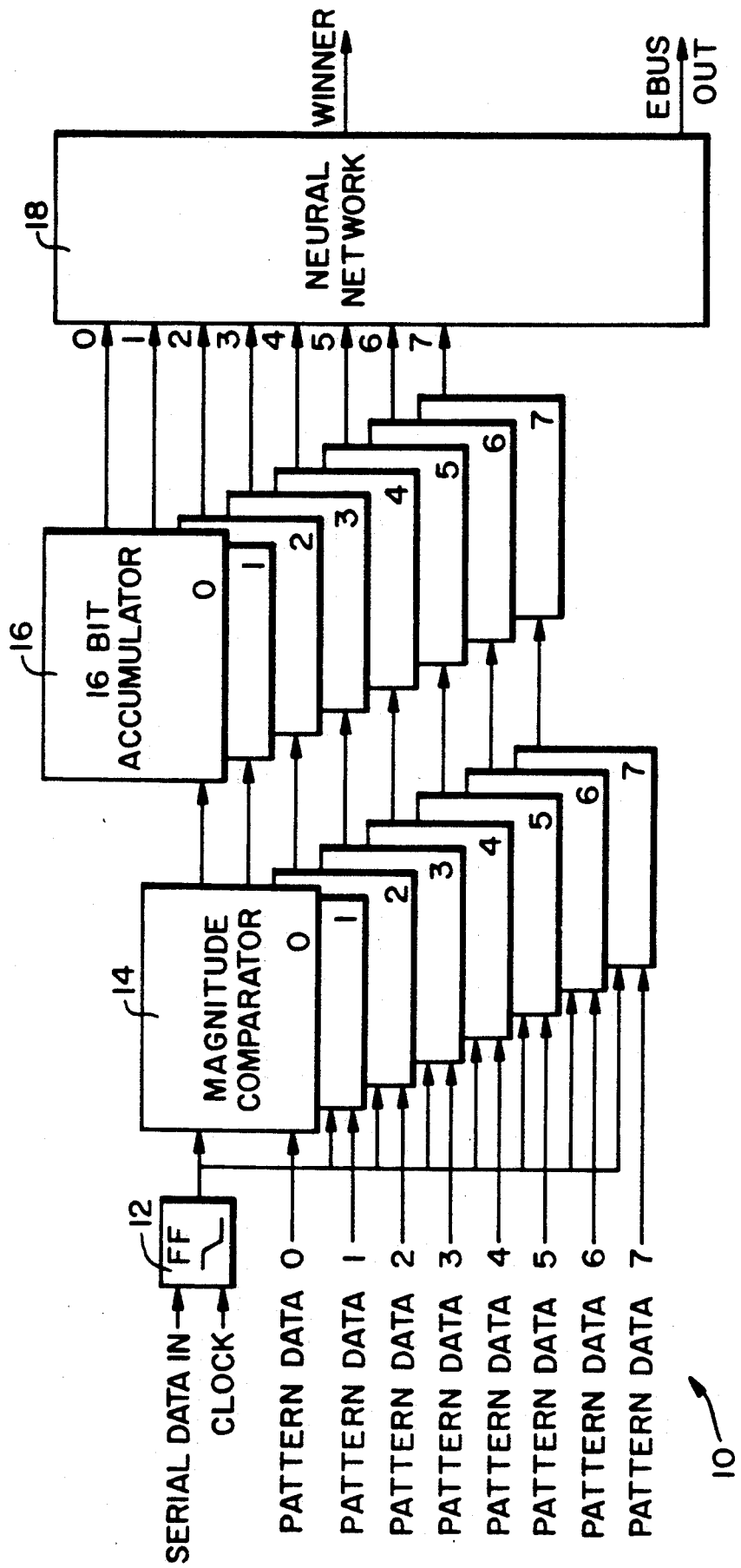
FIG. 1 illustrates a block diagram of a conventional pattern comparator using fuzzy logic to obtain a best match between input data and stored pattern data.
Figure 2:
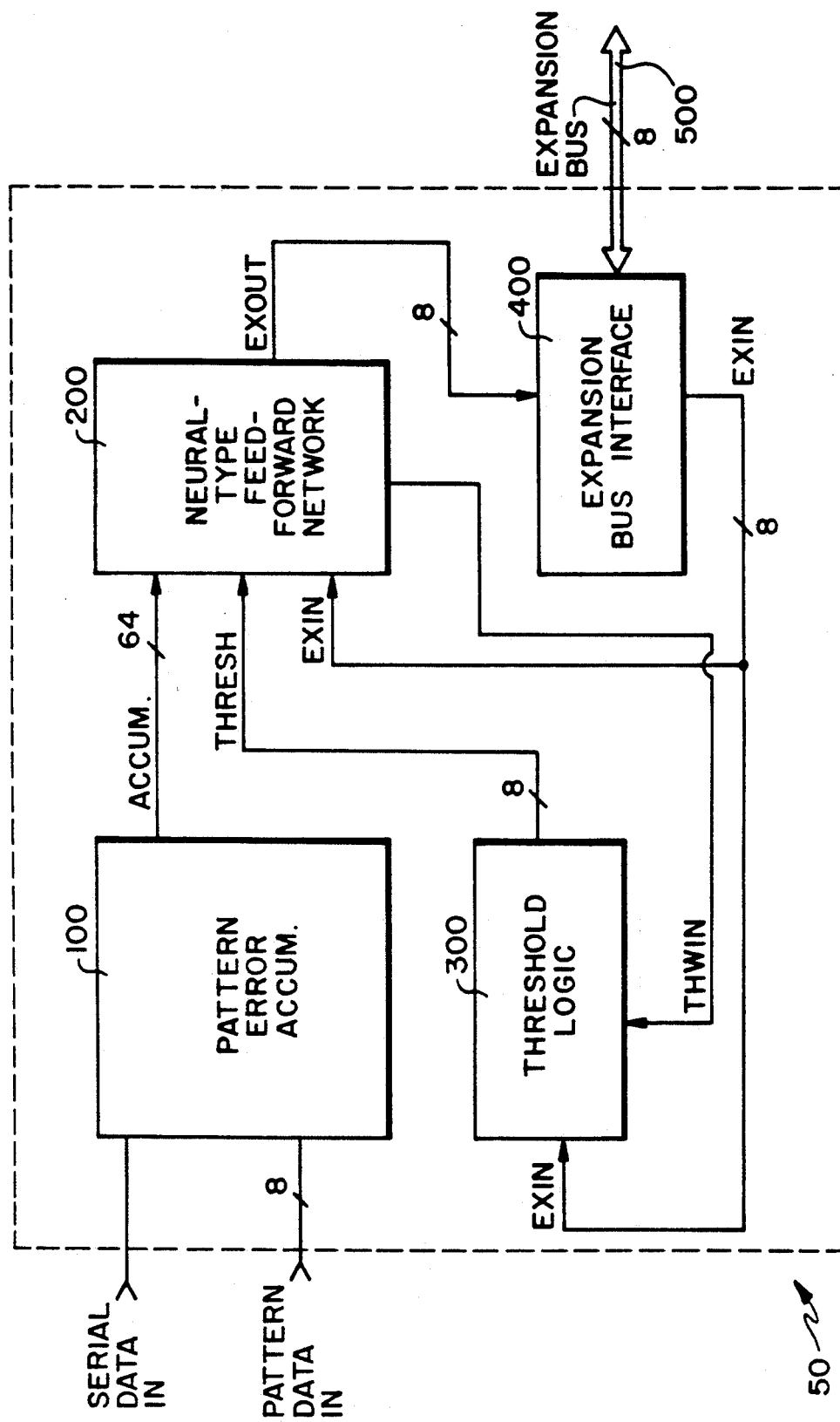
FIG. 2 shows a block diagram of a pattern comparator according to a preferred embodiment of the present invention.

FIG. 2 shows a block diagram of a pattern comparator according to a preferred embodiment of the present invention. The pattern comparator 50 includes a pattern error accumulator 100 which receives input serial data (SERIAL DATA IN) least-significant-bit first and latches the data in response to a CLOCK signal (not shown). The pattern error accumulator 100 also receives simultaneously eight pattern data streams via eight serial inputs (PATTERN DATA IN) least-significant-bit first which are latched into the pattern error accumulator 100 synchronously with the SERIAL DATA IN by the CLOCK signal (not shown). Thus, the pattern error accumulator 100 synchronously receives the serial input data from the input SERIAL DATA IN and the eight pattern data streams from the eight-bit input PATTERN DATA IN.

As described below, pattern error accumulator 100 may be implemented to compare eight unknown data patterns to one known pattern, or in the alternative to compare eight known data patterns to one unknown pattern. In either case, the pattern error accumulator 100 compares a bit-field with the input serial data to each of the eight pattern data. A bit-field is a user-selectable field of bits having a length of one to eight bits. The pattern error accumulator 100 determines the distance value between the bit-field of the SERIAL DATA IN and each PATTERN DATA IN and accumulates the distance value for each PATTERN DATA IN in an accumulator within the pattern error accumulator 100 (see FIG. 3 and accompanying text below). After the comparison for the bit-fields has been performed a predetermined number of times, a thirty-two bit accumulated distance value is obtained for each of the eight pattern data streams. According to the preferred embodiment, the pattern error accumulator 100 simultaneously outputs a selected significant eight bits (1 byte) of the accumulated distance value for each of the eight pattern data streams, resulting a 64-bit wide ACCUM signal.

The ACCUM signal is input to a neural-type feed-forward network 200 in order to compare the selected bytes of the accumulated distance values for the eight pattern data streams. The selected significant bytes of the accumulated distance values on the ACCUM signal line are simultaneously compared with an eight-bit THRESHOLD signal, which represents a corresponding significant byte of a 32-bit threshold value. In addition, the ACCUM and THRESH signals are simultaneously compared with an eight-bit EXIN signal, which represents the corresponding significant byte of an accumulated distance value found on an expansion bus 500 (see FIG. 5 and accompanying text).

As described in detail below, the neural-type feed-forward network 200 performs a bit-by-bit comparison of the eight accumulated distance values on the ACCUM signal line, the threshold value on the THRESH signal line, and the value on the expansion bus 500 input by the EXIN signal line. After each bit-by-bit comparison, the neural-type feed-forward network 200 outputs an eight-bit EXOUT signal to an expansion bus interface 400. The EXOUT signal represents the minimum (or maximum) value obtained from the neural-type feed-forward network 200 after each comparison for a given significant bit. At the same time, the neural-type feed-forward network 200 outputs a THWIN signal to a threshold logic 300 when the THRESH wins the comparison as a minimum (or maximum).

The expansion bus interface 400 outputs the EXOUT signal from the neural-type feed-forward network 200 onto an expansion bus 500. At the same time, the expansion bus interface 400 places the data on the expansion bus 500 and puts the data from the expansion bus 500 onto the eight-bit EXIN signal line, which is simultaneously input to the threshold logic 300 and the neural-type feed-forward network 200.

The threshold logic 300 latches the EXIN signal if the THWIN signal is high, indicating that the THRESH signal input to the neural-type feed-forward network 200 was not a minimum (or maximum) value among the eight accumulated distance values on the ACCUM signal line or the EXIN signal.

An operation of the pattern comparator 50 will now be briefly described. The pattern error accumulator 100 latches, least-significant-bit first, serial data from the SERIAL DATA IN line and the PATTERN DATA IN signal lines. After the comparison for the bit fields (for example, an eight-bit serial data word) has been performed a predetermined number of times, the most significant eight bits of each accumulated distance value for the corresponding pattern data is first input to the neural-type feed-forward network 200 as the most significant byte. At the same time, the neural-type feed-forward network 200 receives the most significant eight bits of the thirty-two-bit threshold value stored in the threshold logic 300 via the eight-bit THRESH signal path as the most significant byte. The neural-type feed-forward network 200 also receives the most significant eight bits from the EXPANSION BUS 500 (during the initial comparison of the most significant bit, the value of EXIN is FF hexadecimal) as the most significant byte.

The neural-type feed-forward network 200 then determines on a bit-by-bit basis, starting with the most significant bit, which of the input signals has the minimum (or maximum) value. For example, after the most significant bit of all the inputs have been compared, the neural-type feed-forward network outputs the "best obtained value" as the EXOUT signal, which represents the minimum (or maximum) value determined after one comparison of the most significant bit.

Assuming that there is no other device connected to the expansion bus interface 400, the EXOUT signal is equal to the EXIN signal, which is fed back to the neural-type feed-forward network 200 and is also input to the threshold logic 300. If the neural-type feed-forward network determines that the THRESH signal is the minimum (or maximum) signal, then the THWIN signal goes low, or TRUE. As a result, the threshold logic 300 updates the threshold registers with the EXIN value if the THWIN signal goes high, indicating that the previously stored threshold value is not a minimum. The threshold logic 300 then outputs the updated THRESH signal. The neural-type feed-forward network 200 then continues the comparison process by successively comparing the next-highest significant bit.

The specific features of the present invention will become more readily apparent with the following descriptions.

Figure 3:
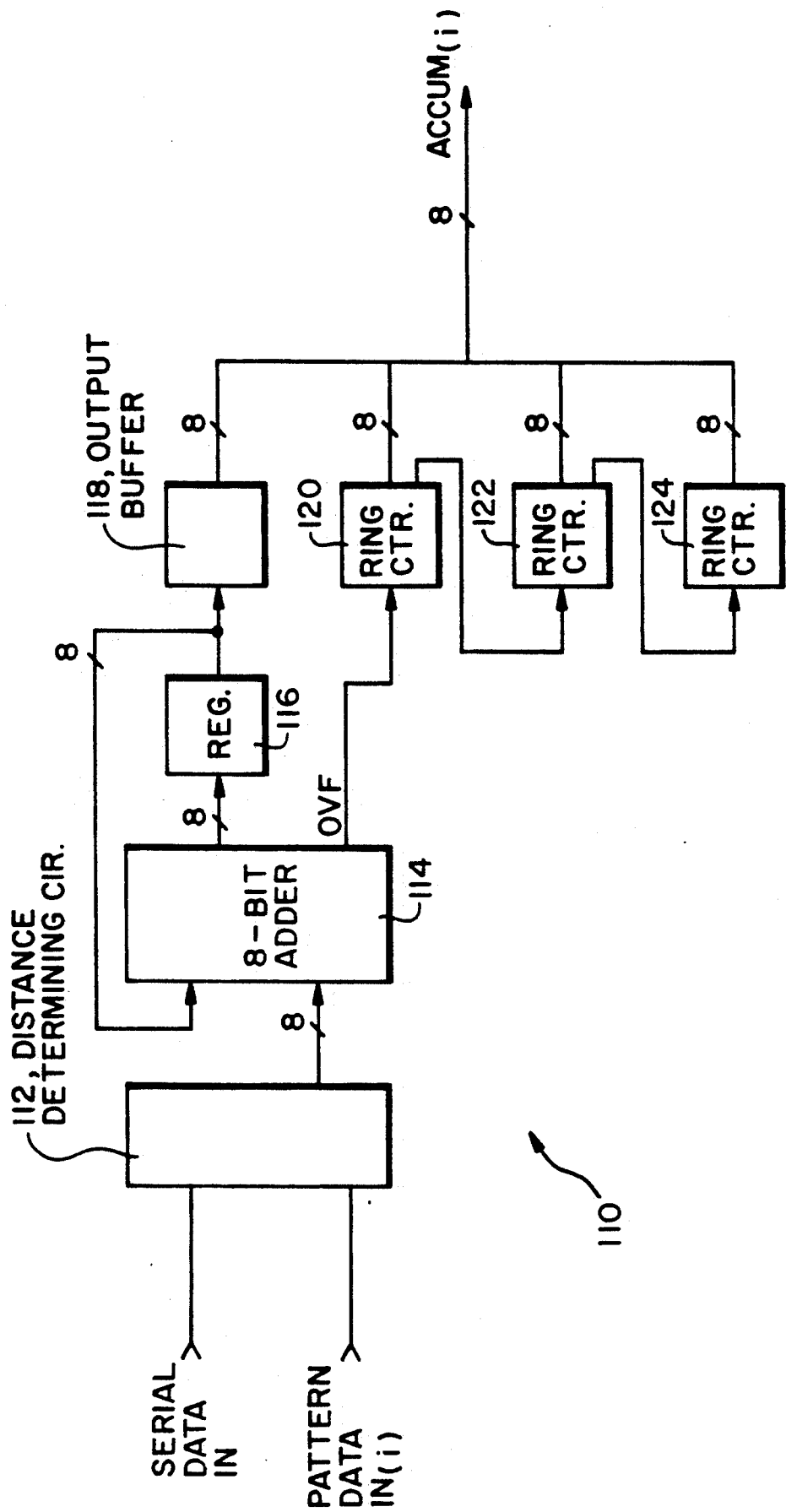
FIG. 3 shows a block diagram of the pattern error accumulator of FIG. 2.

FIG. 3 shows a block diagram of an accumulator circuit 110 which determines an accumulated distance value with respect to the serial input from the SERIAL DATA IN signal line and one of the pattern data streams from a PARALLEL DATA IN$_{(1)}$ signal line. Thus, the pattern error accumulator 100 includes a separate accumulator circuit 110 for each of the eight pattern data streams. The accumulator circuit 110 outputs one byte of the accumulated distance value corresponding to the input serial data and the respective one of the parallel data streams on the signal line ACCUM$_{(1)}$.

The accumulator circuit 110 includes a distance determining circuit 112, which determines the distance between the bit-field of the serial data input and the pattern data. For example, the distance determining circuit may include an adder which performs 1's or 2's complement addition on the data in order to obtain a difference value. The eight-bit distance value output by the distance determining circuit 112 represents the "distance" of the pattern data from the serial data.

The distance determining circuit 112 compares the data by fields which are 1 to 8 bits long. Thus, if a field length is limited to 1, a bit-by-bit comparison (Hamming distance) is performed. If the field length is between 2 and 8 bits, a linear distance measure is performed. The field length is selectable by the user. As shown in the disclosed embodiment, the selectable field length can be set from one to eight bits long; however, one skilled in the art will realize that the field length can be selected to be from one to n bits long.

The distance value from the distance determining circuit 112 is input to an 8 bit adder 114, which adds the output of the distance determining circuit 112 to an accumulated distance value stored in register 116. The result of addition is output and stored in register 116. The accumulated distance value stored in register 116 is also output to an output buffer 118.

If the adder 114 during the addition process has an overflow, the overflow (OVF) signal is input to ring counter 120, which is incremented each time an OVF signal is output from the adder 114. If the ring counter 120 reaches its maximum count, it rolls over and outputs a carry signal to the input of a second ring counter 122. Similarly, if the ring counter 122 rolls over, a carry signal is output from the ring counter 122 to the ring counter 124.

The output buffer 118 and the ring counters 120, 122 and 124 each have tri-state outputs tied to an 8 bit ACCUM$_{(1)}$ signal line. Thus, the output buffer 118 and the ring counters 120, 122 and 124 collectively provide the 32 bit accumulated distance value between the serial data (SERIAL DATA IN) and the corresponding pattern data input on the PATTERN DATA IN$_{(1)}$ signal line. The ring counter 124 outputs the most significant byte of the 32 bit accumulated distance value; the ring counter 122 outputs the next most significant byte of the accumulated distance value; the ring counter 120 outputs the third-to-most significant byte; and the output buffer 118 outputs the least-significant byte of the accumulated distance value.

It will also be noted that although a 32-bit accumulated distance value is disclosed, the accumulated distance value may have a bit-length from one to n bits, depending on the application.

Thus, each accumulator circuit 110 of the pattern error accumulator outputs a given significant byte of the accumulated distance value in response to control logic within the pattern comparator 50 (not shown).

Figure 4A:
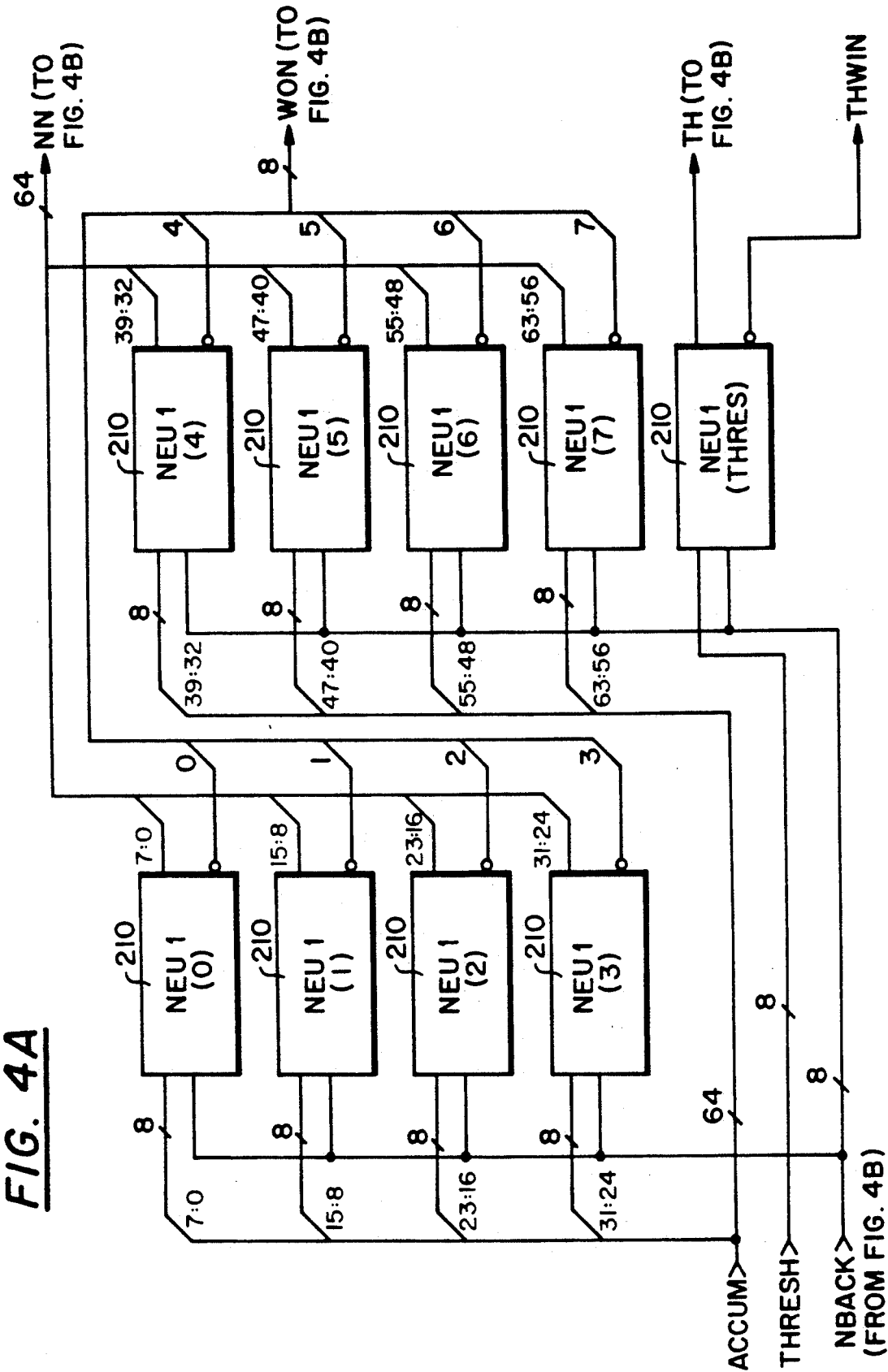
FIGS. 4A and 4B show block diagrams of the neural-type feed-forward network of FIG. 2.
Figure 4B:
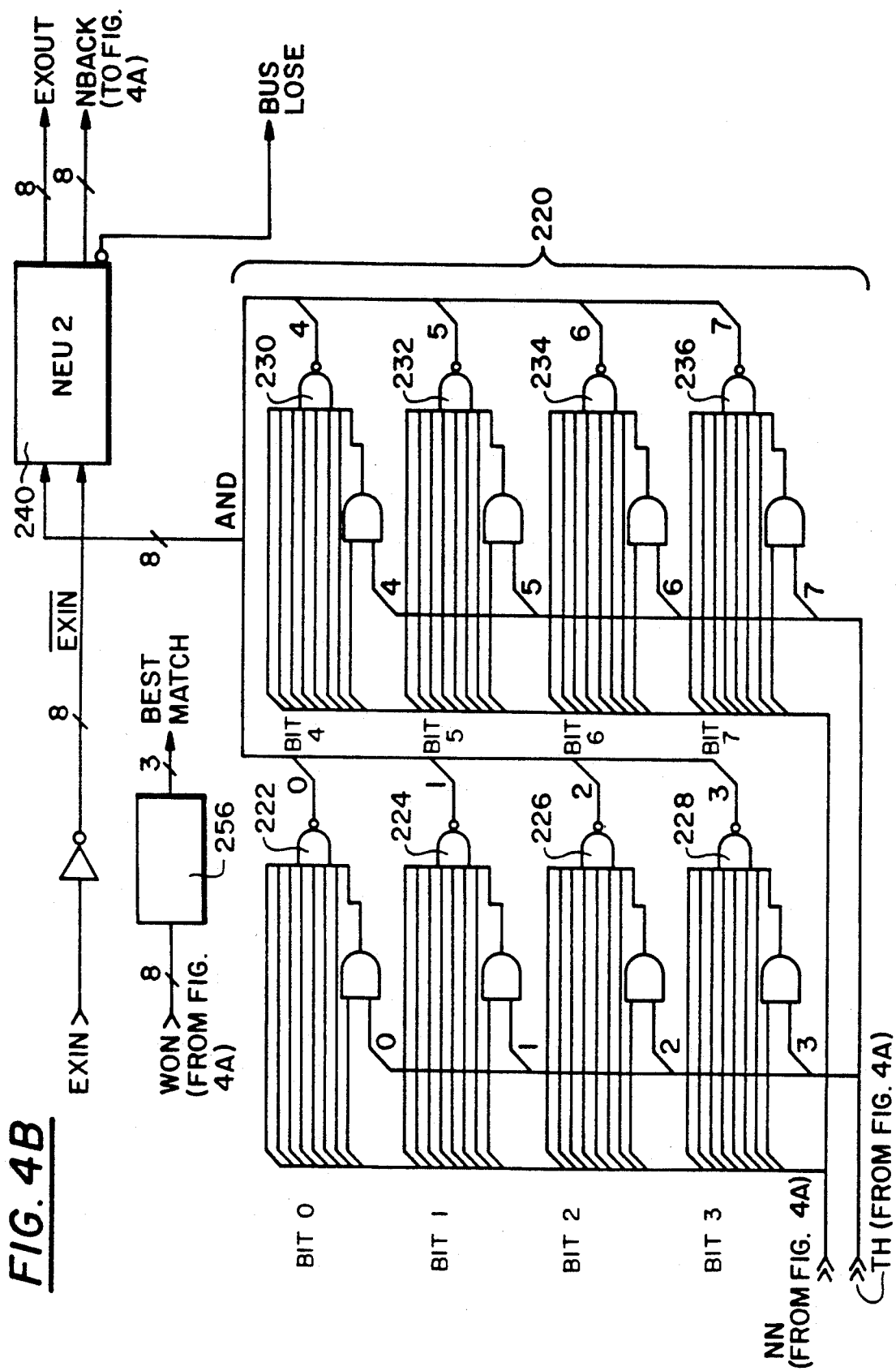

FIGS. 4A and 4B show block diagrams of the neural-type feed-forward network 200 of FIG. 2. The neural-type feed-forward network 200 performs a bit-by-bit comparison, starting with the most significant bit, of the eight accumulated distance values on the ACCUM signal line one byte at a time. The accumulated distance values on the ACCUM signal line are simultaneously compared with the corresponding significant byte of the threshold value on the THRESH signal line. The byte values on the ACCUM and THRESH signal lines are also compared simultaneously with an NBACK signal line, which represents the minimum (or maximum) value obtained after each bit-by-bit comparison (see below). In other words, the NBACK signal line represents the best current minimum (or maximum) during the comparison process, which is output from a NAND tree 220 (see below).

As shown in FIG. 4A, the ACCUM signal line is divided such that each byte of an accumulated distance value for a corresponding pattern data stream is input into a primary neuron 210, also referred to as NEU1. Thus, the NEU1(0) and the NEU1(7) receive the selected significant byte of the accumulated distance value for pattern data 0, and pattern data 7, respectively. The primary neuron NEU1 (THRESH) receives the corresponding significant byte of the threshold value on the THRESH signal line. In addition, all the primary neurons 210 receive the 8 bit NBACK feedback signal. Each primary neuron 210 compares its respective input with the NBACK value and outputs the minimum (or maximum) value onto the NN signal path. In addition, whenever the respective input is equal to the inverse of the NBACK signal (for example, ACCUM = $\overline{\text{NBACK}}$), the neuron 210 outputs the inverted WON signal (logic low), indicating that the neuron NEU1 recognizes its input to currently be a best input, for example, a minimum (or maximum).

It will be noted that the primary neuron NEU1 (THRESH) operates the same as the other neuron, except that the 8-bit THRESH signal is input thereto.

FIG. 4B shows a second part of the neural-type feed-forward network 200. A NAND tree 220 is arranged under the following principle: when two digital values are compared to determine a minimum (or maximum), the comparison will first be determined on the basis of the most significant bit. If the most significant bits of the two digital values being compared are different, then the comparison is complete and the lower significant bits can be disregarded. In other words, in determining the minimum between the two digital values 0111 and 1000, only the most significant bit need be considered, and the lower significant bits may be disregarded.

As a result, the NAND tree 220 determines whether, for a given significant bit, any of the outputs from the primary neuron 210 have a different value for the corresponding significant bit. If there are any outputs which do not have the same value for the corresponding significant bit, the NAND tree 220 in effect outputs the winning value as an 8-bit AND signal. A secondary neuron 240 (NEU2) register compares the AND signal with the inverse of the EXIN signal from the expansion bus interface 400.

If the pattern comparator 50 is not coupled to the EXPANSION BUS 500, then the secondary neuron 240 (NEU2) receives the inverse value of EXIN as value FF hexadecimal. The NBACK signal output from the secondary neuron 240 is identical to the AND signal from the NAND tree 220. Thus, the NAND tree 220 in effect outputs a bit suppression signal as the feedback input (NBACK) to suppress the analysis of lower order bits in any primary neuron 210 having any losing outputs given for a significant bit.

Although not shown in FIG. 4A, each primary neuron 210 may also receive a disable input and a MIN/MAX input utilized to invert the respective input data (for example, ACCUM, THRESH) inputs for maximum comparisons. The disable input may be provided by a control circuit of the pattern comparator 50 (not shown).

Figure 6:
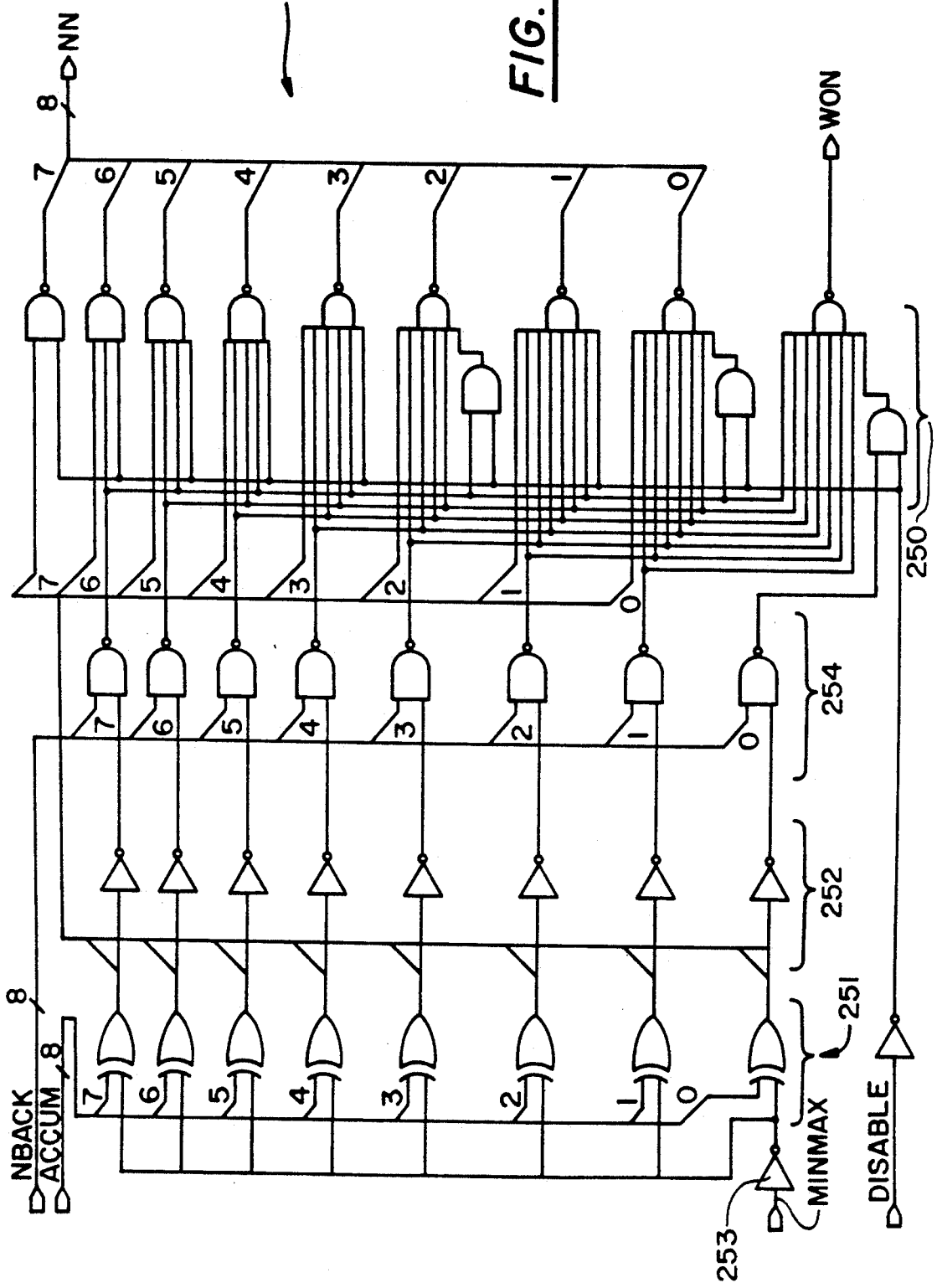
FIG. 6 shows one of the primary neurons of FIG. 4A.

FIG. 6 discloses a primary neuron 210 from FIG. 4A. Primary neuron 210 includes exclusive or (XOR) gate array 251, an inverter array 252, NAND gate arrays 250 and 254. The XOR gate array 251 receives inputs from the ACCUM signal line and a MINMAX signal after being inverted by an inverter 253. The MINMAX signal is provided by control logic in the pattern comparator (not shown) such that a minimum comparison is performed when the MINMAX signal value is logically low. If the MINMAX signal is a logic low, the inverter 253 outputs a high signal to the XOR array 251, so that the output of the XOR gate array 251 is an inverse of the ACCUM signal. The output of the XOR array 251 is also inverted by the inverter array 252, so that the NAND gate array 254 receives as inputs the NBACK signal and the ACCUM signal.

As shown in FIG. 6, the logic of the primary neuron 210 is such that if the ACCUM value is less than or equal to the NBACK value, then the primary neuron 210 outputs the ACCUM value on the NN signal line output from NAND gate array 250. Further, if there is a difference in the inputs between the ACCUM signal line and the NBACK signal line, then the WON signal line output from NAND gate array 250 goes high; otherwise, if the inputs are the same, the WON signal line remains low. As a result, the neuron 210 recognizes that the input signal (ACCUM) is equal to the best current input (NBACK) when the WON output is low. As shown in FIG. 4A, the WON output will be supplied as an inverted output, so that the input signal is a winning value if WON is low. Also as shown in FIG. 6, the disable signal (DISABLE) is input to the NAND gate array 250. A selected byte of the ACCUM signal is input to invertor array 252. The outputs of the invertor array are supplied to the NAND gate array 254 along with the corresponding significant bits of the NBACK signal.

The operation of the neural-type feed-forward network will now be described with reference to FIGS. 4A, 4B, and FIG. 6. At this time, it should be assumed that the expansion bus 500 is not connected to the pattern comparator 50, so that the signal EXIN need not be of concern.

A timing chart illustrating the operation of the neural-type feed-forward network 200 is shown in the attached Appendix. A description of each of the columns of the timing chart is shown below in Table 1. In addition, the timing chart is grouped into 9 sections. A summary of each of the timing sections is shown in Table 2, below.

TABLE 1

1. Time (nanoseconds)
2. 8 bit data in to Neuron A
3. 8 bit data in to Neuron B
4. Neuron A 8-bit data out
5. Neuron B 8-bit data out
6. Common 8 bit data feedback bus (NBACK)
7. WON indicator for Neuron A
8. WON indicator for Neuron B

TABLE 2

| | Time | Function |
|---|---|---|
| 1. | 0.00–4.02 | Initialize Network |
| 2. | 20.00–22.62 | Data A in = 00 |
| | | Data B in = FF |
| | | Neuron A wins |
| 3. | 30.72–34.57 | Flush Network |
| 4. | 40.96–43.58 | Data A in = FF |

TABLE 2-continued

| | Time | Function |
|---|---|---|
| | | Data B in = 00 |
| | | Neuron B wins |
| 5. | 51.20–55.05 | Flush Network |
| 6. | 61.44–64.15 | Data A in = AA |
| | | Data B in = FF |
| | | Neuron A wins |
| 7. | 71.68–77.83 | Data A in = AA |
| | | Data B in = 55 |
| | | Neuron B wins |
| 8. | 81.92–87.18 | Data A in = 3 |
| | | Data B in = 55 |
| | | Neuron A wins |
| 9. | 92.16–95.95 | Data A in = 3 |
| | | Data B in = 1 |
| | | Neuron B wins |

Referring to time 71.68–77.83 of the Appendix, assume that two of the primary neurons 210 receive inputs A and B, respectively, referred to as primary neuron A and primary neuron B. The MSB of the inputs will be referred to as bit 7, and the LSB will be referred to as bit 0, and the intermediate bits will be referred to herein as bits 6, 5, 4, 3, 2, and 1, respectively. The input A has a fuzzy value of AA hex (10101010 binary) and the input B has a fuzzy value of 55 hex (01010101 binary). The inputs A and B are simultaneously applied to the primary neurons A and B at time 71.68, and all other primary neurons 210 are disabled by their respective disable (DISABLE) signal. In other words, it would be assumed that the input A is for NEU1(0) and that input B is for NEU1(THRES); this operation would be performed in the event that the serial data is compared to only a single pattern data, and the threshold value.

Bit 7 of input A is a logic "1" and input B is a logic "0", so that due the output of the primary neurons occurs at times 72.13 as shown in the Appendix. At this time, the primary neuron A has a logic "1" on its MSB, and the primary neuron B has a logic "0" on its MSB. As shown at time 73.64 in the Appendix, the primary neuron A has determined that it is losing the comparison with primary neuron B and, therefore, begins removing itself from the NN bus by forcing its output values high. At time 74.76, the primary neuron A has completely disabled itself by forcing all its outputs to a logic value "1". Since the primary neuron A has been removed from competition, the primary neuron B begins to assert its input data onto the NN bus. This process continues, rippling through the several gate delays until time 76.84. At time 77.33, the primary neuron B has determined that it is the winner and has registered the event by causing the inverted output of the WON signal line to go low.

Therefore, each primary neuron 210 is able to determine whether the associated input when compared to the feed-back signal, NBACK, is a candidate to provide the best fit pattern data. If the primary neuron 210 determines that its corresponding input is not a likely candidate, the neuron shuts itself down by forcing its outputs to a logic "1", thereby enabling the remaining neurons to compete without interference from the neurons which do not have candidates as inputs. It will be readily apparent that since the operation is performed in parallel, the comparison may be performed using all the primary neurons so that the distance values of all eight pattern data are simultaneously compared to the threshold value without any loss in processing speed.

As indicated above, the most significant byte of the 32-bit distance values and the threshold are first supplied on the ACCUM and THRESH signal lines. If a winner is found from the most significant byte, then comparison of the lower significant bytes is not necessary. However, if a winner is not found as a best match after comparing the most significant byte, then the comparison cycle is repeated using the next-most-significant byte, and so on.

As indicated above, a neuron 210 which has determined that it is the winner registers the event by causing the inverted output of the WON signal to go low. This result is stored in a best match register 256, as shown in FIG. 4B. The best match register stores as a three-bit octal value which of the eight pattern data streams are a best match for the input data stream. The output from the register 256 will be read by the control circuitry of the pattern comparator 50 (not shown), which will process the identification of the best match accordingly.

Figure 9:
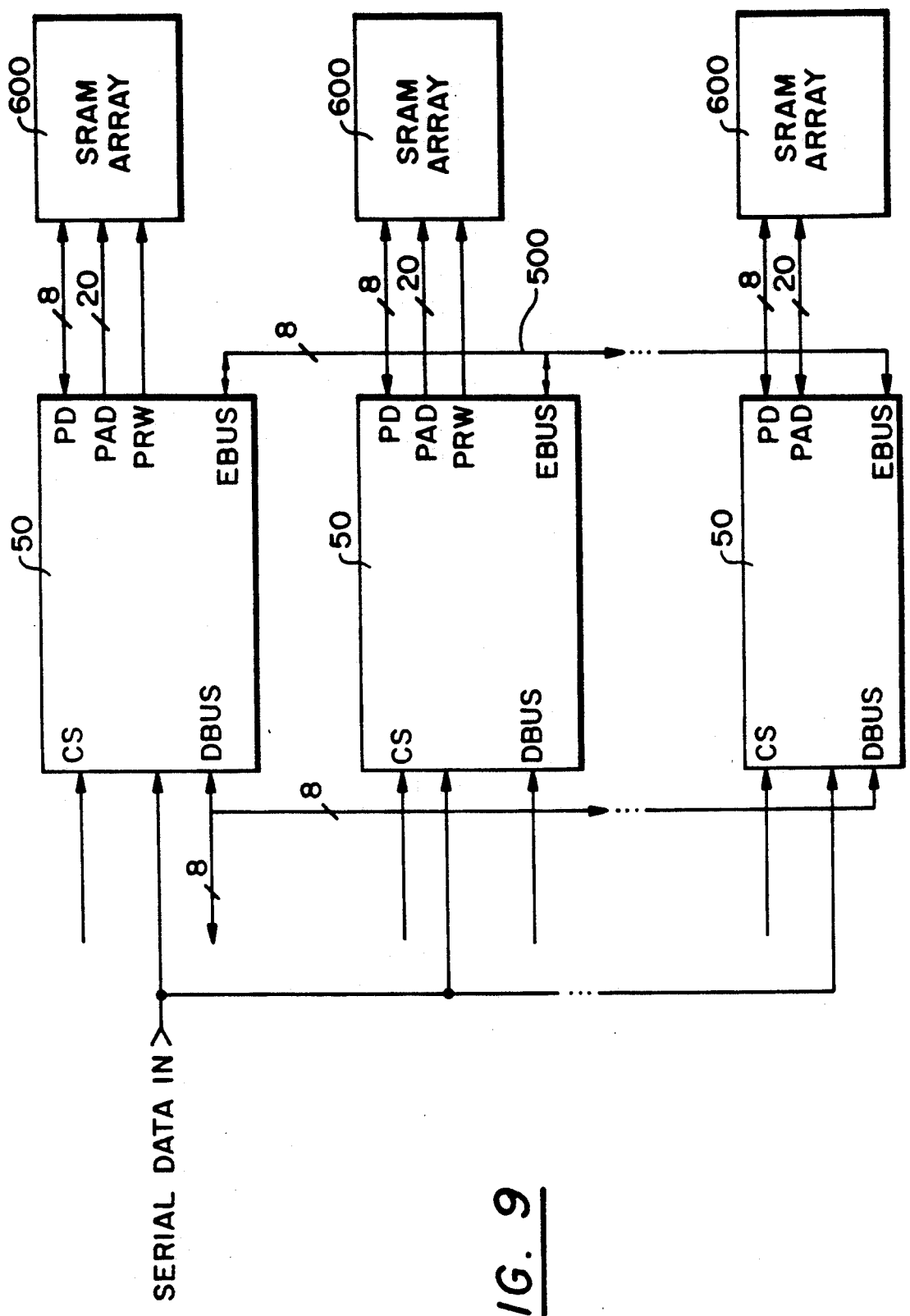
FIG. 9 shows an arrangement of a plurality of pattern comparators coupled to an expansion bus to provide expansion of simultaneous pattern comparisons.

The secondary neuron 240 (NEU2) will now be described with respect to FIGS. 4B and FIG. 7. As indicated above, the secondary neuron 240 compares the output signal (AND) from the NAND tree 220 to the inverse of the EXIN signal from the expansion bus 500 when a plurality of the pattern comparators 50 are coupled to increase the number of devices to be connected in parallel. By connecting a plurality of pattern comparator devices 50 in parallel, as shown in FIG. 9, the number of simultaneous pattern comparisons can be increased.

Figure 7:
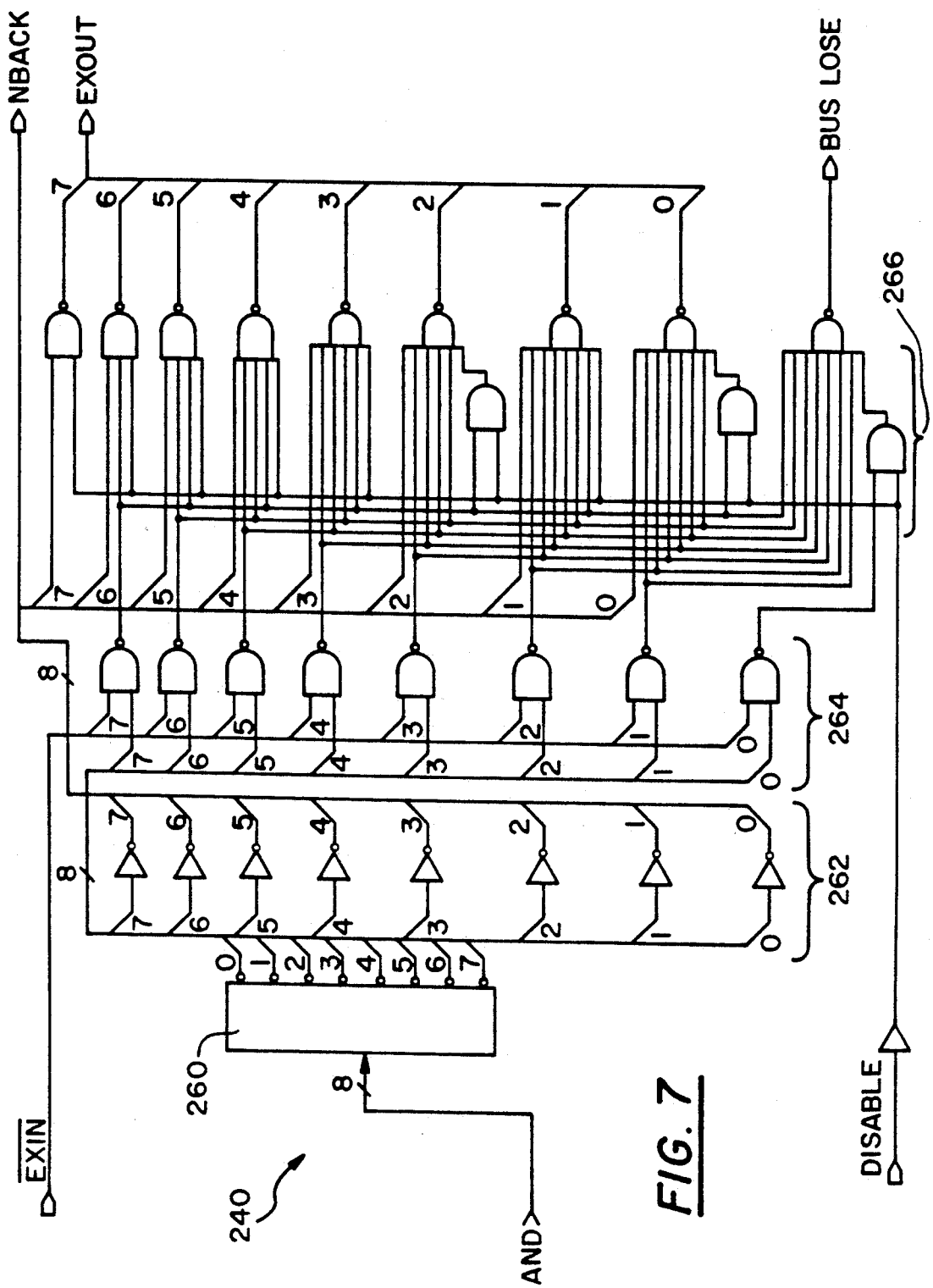
FIG. 7 shows a circuit diagram of the secondary neuron of FIG. 4B.

As shown in FIG. 7, the secondary neuron 240 receives the inverted input from the EXIN signal line. The secondary neuron 240 includes a buffer 260 which buffers the output (AND) of the NAND tree 220 shown in FIG. 4B. The inverted outputs of the buffer 260 are then inverted by an invertor array 262 so that the resulting output (NBACK) is equal to the output (AND) of the NAND tree 220. The inverted outputs of the buffer 260 also are input to a NAND gate array 264, along with the corresponding bits of the inverted signal from the expansion bus (EXIN).

By comparing the secondary NAND gate arrays 264 and 266 of the secondary neuron 240 in FIG. 7 to the corresponding NAND gate arrays 254 and 250 of the primary neuron 210 shown in FIG. 6, it becomes apparent that the logic of the secondary neuron 240 is similar to the logic of the primary neuron 210. Specifically, if the input value (AND) is less than or equal to the feedback value from the expansion bus ($\overline{EXIN}$), then the output of the NAND gate array 266 (EXOUT) is equal to the input value (AND). Also, if there is a difference in the inputs, the signal line BUS LOSE goes high; if however, the inputs are the same, then the output BUS LOSE remains low. If the signal BUS LOSE goes low, the secondary neuron 240 indicates that the local device candidate (AND) is less than or equal to the candidate on the expansion bus (EXIN). As a result, the BUS LOSE signal from the secondary neuron 240 indicates to the control logic of the pattern comparator 50 (not shown) that its candidate can prevail over all the other candidates of the respective devices on the expansion bus.

As a result, as shown in FIG. 4B the BUS LOSE signal identifies the pattern comparator 50 to be the device which contains the pattern having the best match, and the BEST MATCH signal identifies which of the eight possible pattern data streams are the best match to the serial data. It will be recognized by those skilled in the art that the BUS LOSE signal and the BEST MATCH value can be detected and applied in different ways, such as an interrupt vector, a polling sequence or storing the results in an internal register to be read by an external microprocessor, for example.

FIG. 9 shows a plurality of devices 50 coupled to memory 600 which stores data patterns. The devices serially input the pattern data via 8-bit inputs (PD) and address the memory 600 via an address bus (PAD). In addition to reading data, each device 50 can write data to the memory 600 via the data bus (PD) by controlling the read/write line (PRW). The reading and writing by the device 50 is controlled by internal control logic.

Figure 5:
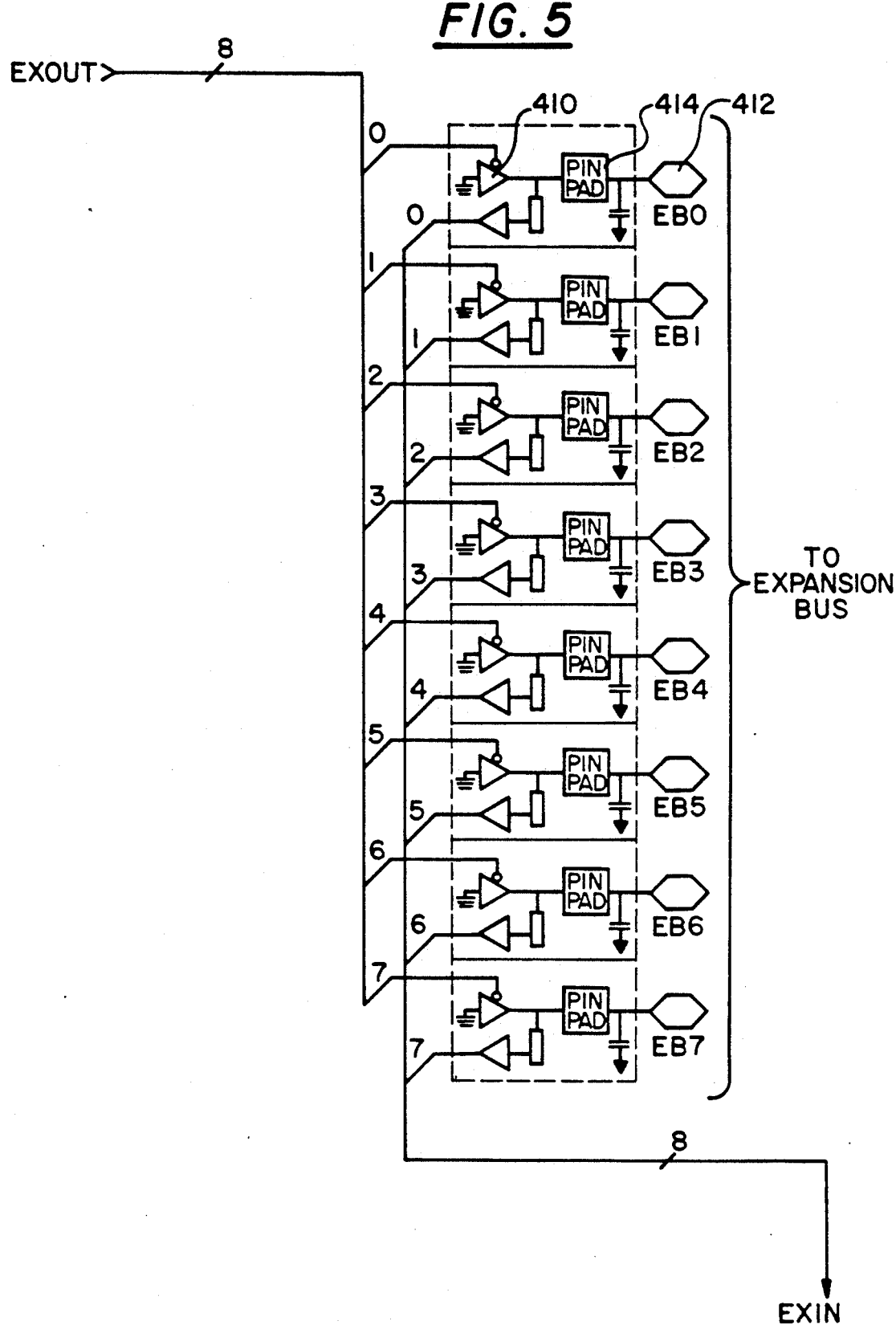
FIG. 5 shows a circuit diagram of the expansion bus interface of FIG. 2.

FIG. 5 shows an exemplary circuit diagram of the expansion bus interface 400 shown in FIG. 2. As shown in FIG. 5, each bit of the EXOUT signal drives a tri-state buffer 410. At the same time, the signal data from the expansion bus is conducted by an electrode 412 and a pin pad 414. As a result, if the signal path on the expansion bus is a logic zero, the output of the tri-state buffer 410 is also forced low. Therefore, the tri-state buffer 410 effectively functions as an open collector output so that even though the EXOUT signal may be high, the EXIN signal will be low if the corresponding bit on the expansion bus is low. Therefore, the expansion bus will always apply the minimum value supplied of all the devices 50.

When the devices 50 are first initialized, the EXOUT signal has an initial high state (11111111) due to the NAND gate array 266 shown in FIG. 7. Therefore, since the comparison in the neural-type feed-forward network 200 is performed on a bit-by-bit basis starting with the MSB, a bit on the extension bus will be pulled low only when one of the devices asserts a low value on its respective EXOUT signal line. Therefore, the EXIN signal on the expansion bus interface 400 effectively represents the minimum distance value of all the devices 50 on the expansion bus 500.

Figure 8:
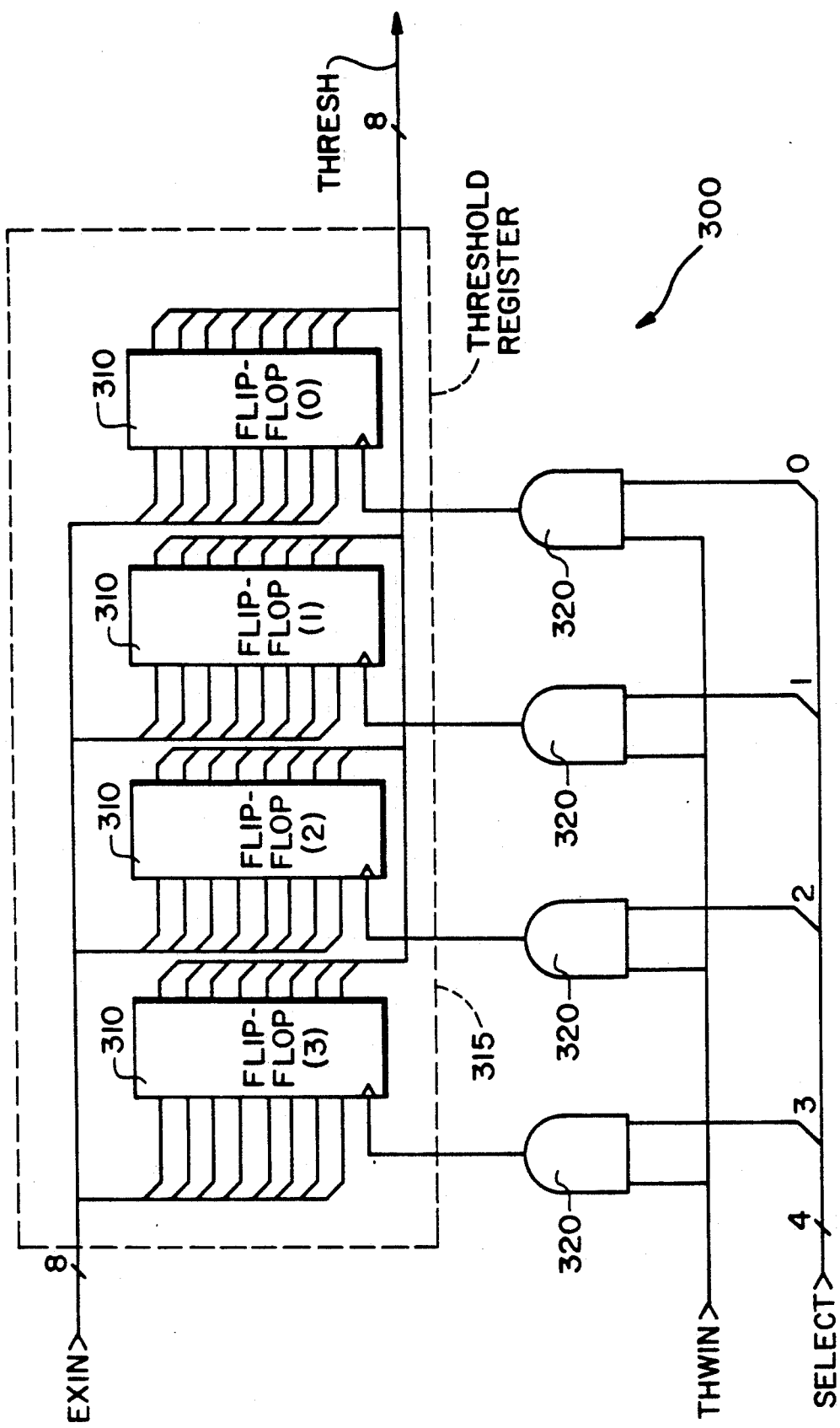
FIG. 8 shows a block diagram of the threshold logic shown in FIG. 2.

FIG. 8 shows a block diagram of the threshold logic 300 shown in FIG. 2. As described above, the 8-bit signal EXIN represents the minimum distance value for all the devices on the expansion bus 500. If the pattern comparator 50 is used in a stand-alone mode, then the signal EXIN equals the inverse of the output of the NAND tree 220 shown in FIG. 4B, which represents the minimal distance value determined by the neural-type feed-forward network 200.

As shown in FIG. 8, the signal EXIN is input to flip-flops 310. The flip-flops 310 may be, for example, octal delay flip-flops. The flip-flops (3), (2), (1), and (0) store the most-significant byte of the threshold, the next-most significant threshold byte, the third-most significant threshold byte and the least-significant threshold byte, respectively. Each of the flip-flops 310 have a positive edge-triggered clock input. Thus, the flip-flops 310 will not latch the data on the EXIN signal path until a clock pulse is received from the corresponding AND gate 320.

Each of the AND gates 320 receive the THWIN signal from the neural-type feed-forward network 200 and a predetermined bit from a select signal. The select signal (SELECT) supplied by the control logic (not shown) of the pattern comparator 50 and selects one of the flip-flops 310 to latch the corresponding significant byte asserted on the EXIN signal path. In other words, if the pattern error accumulator 100 and the neural-type feed-forward network are operating on the most-significant byte of the 32-bit wide accumulated distance value, bit 3 of the select line will go high so that the flip-flop (3) will latch the data if the THWIN signal is high.

Once the data has been latched by the flip-flops 310, the latched data is output as the updated threshold value onto the 8-bit THRESH signal line.

The operation of the threshold logic 300 in conjunction with the neural-type feed-forward network 200 will now be described.

A user selects via the control logic with the pattern comparator 50 (not shown) whether the threshold logic 300 to store an initial threshold value in the flip-flops 310 or whether the pattern comparator 50 should automatically determine the optimal value of the threshold register. If the pattern comparator 50 is to automatically determine the maximum threshold value (e.g. the maximum number of pattern errors that can appear in an accumulator and still register a win), the threshold register is set to a maximum value (all 1's). The neural-type feed-forward network 200 then compares the accumulated distance values from the pattern error accumulator 100 (ACCUM) and the data on the expansion bus (EXIN) with the threshold stored in the threshold register 315 (THRESH). The THWIN signal will go high if the THRESH value is not a minimum value. Since the threshold register initially holds a maximum value, the threshold register will be updated with the minimum 32-bit accumulated distance value as compared by the feed-forward network 200. Thus, the threshold register 315 will be automatically updated so that the threshold value (THRESH) will be produced to equal the minimum accumulated distance value.

If a user desires to determine a minimum value of a threshold (e.g. the minimum number of pattern errors that can appear in an accumulator and still register a win), the threshold register 315 is set to zero and the neural-type feed-forward network has its inputs inverted to operate in a maximum mode by setting the MINMAX signal to a high level (see FIG. 6). When the threshold register 315 is set to zero, the input data being compared must be exactly equal to one of the stored data patterns in order to result in a win. Thus, as the threshold is increased in the threshold register 315, the fuzziness of the input data with respect to the stored data patterns is also increased. As a result, the user is able to have the pattern comparator 50 determine the upper or lower threshold boundaries in a data set. After each of the upper and lower thresholds has been determined, the thresholds can be stored via external logic (not shown).

As shown above, the pattern comparator 50 is capable of providing an update threshold function. The threshold register 315 stores the maximum (or minimum) number of pattern errors that can appear in an accumulator and still be considered a best fit. Also, the threshold register can be updated to determine a minimum (or maximum) value of the threshold register. This automatic update function is particularly effective in applications where real-time pattern data may change over time due to various conditions. For example, the automatic update threshold function is particularly effective in missile tracking systems where the background of the image may change despite the tracking of the missile. The automatic update threshold function can vary the threshold so that the missile can be accurately tracked.

Another application for the automatic update threshold function is in the use of surveillance equipment, such as smart cameras. The smart cameras need to distinguish between humans and animals. This may be particularly difficult when different light and weather conditions are encountered. The automatic update threshold function is able to dynamically adjust the threshold as the environment changes. By utilizing a reference target mounted near the intelligent camera, the threshold register can be modified at set intervals so as to filter out environmental changes.

It will be readily apparent to those skilled in the art that when a plurality of devices 50 are supplied on the expansion bus 500, the threshold register 315 for each of the devices 50 will store the same common threshold value. In addition, it will be readily apparent to those skilled in the art that the pattern comparator 50 may be implemented either to be controlled by a central processing unit (CPU), or as a stand-alone IC coupled to memory which stores the pattern data. In such a stand-alone mode, control logic would be provided with the pattern comparator 50 so that overhead functions, such as timing, addressing, data reading/writing, etc., could be adequately performed.

It will also be readily apparent that the pattern comparator 50 can be implemented to provide a learning function. Specifically, the SERIAL DATA IN can be considered the known input and the PATTERN DATA IN shown in FIG. 2 could be considered the unknown inputs.

In addition, pattern comparator 50 can be implemented so that if the accumulated distance values corresponding to the pattern data are not below the threshold, the internal logic of the pattern comparator 50 can be arranged so that the SERIAL DATA IN can be added to the memory 600 as a new pattern to be stored.

Although the pattern comparator searches for a minimum, if ties occur such that more than one accumulated distance value may be deemed at minimum, all such tied values are included in the comparison process. However, the signified winner can be designated as the pattern data having the lowest identification value (0-7) and the device having the lowest device identification. Such an arrangement, the register 256 shown in FIG. 4B would store as the best match the lowest significant signal on the WON bus from the neurons 210.

Although the minimum (or maximum) values are determined according to the preferred embodiment by a neural-type feed-forward network 200, the system could be modified so that the minimum comparison is performed using a CPU.

It will also be readily apparent to those skilled in the art that the memory capacity which stores the pattern data is only limited by the addressing capabilities of the control logic.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

APPENDIX

```
0.03 11111111 11111111 11111111 11111111 11111111 1 1
0.70 11111111 11111111 11111111 11111111 11111111 1 1
0.79 11111111 11111111 11111111 11111111 11111111 1 1
0.85 11111111 11111111 11111111 11111111 11111111 1 1
0.94 11111111 11111111 11111111 11111111 11111111 1 1
1.39 11111111 11111111 11111111 11111111 11111111 1 1
1.45 11111111 11111111 11111111 11111111 11111111 1 1
1.65 11111111 11111111 11111111 11111111 01111111 1 1
1.74 11111111 11111111 11111111 11111111 00111111 1 1
1.80 11111111 11111111 11111111 11111111 00011111 1 1
1.89 11111111 11111111 11111111 11111111 00001111 1 1
2.34 11111111 11111111 11111111 11111111 00000111 1 1
2.40 11111111 11111111 11111111 11111111 00000000 1 1
4.02 11111111 11111111 11111111 11111111 00000000 0 0

20.00 00000000 11111111 11111111 11111111 00000000 0 0 # Neuron 0s input changes to 00.
20.45 00000000 11111111 01111111 11111111 00000000 0 0 # Source 0s output begins to change.
20.54 00000000 11111111 00111111 11111111 00000000 0 0
20.63 00000000 11111111 00011111 11111111 00000000 0 0
20.76 00000000 11111111 00001111 11111111 00000000 0 0
21.12 00000000 11111111 00000011 11111111 00000000 0 0
21.21 00000000 11111111 00000000 11111111 00000000 0 0
21.44 00000000 11111111 00000000 11111111 10000000 0 0 # The feedback input begins to change.
21.53 00000000 11111111 00000000 11111111 11000000 0 0
21.62 00000000 11111111 00000000 11111111 11100000 0 0
21.75 00000000 11111111 00000000 11111111 11110000 0 0
22.11 00000000 11111111 00000000 11111111 11111100 0 0
22.20 00000000 11111111 00000000 11111111 11111111 0 0 # The feedback input settles to its final value
22.62 00000000 11111111 00000000 11111111 11111111 0 1 # Neuron 1 signals defeat.

30.72 11111111 11111111 00000000 11111111 11111111 0 1 # Neuron 0s input changes to ff.
31.25 11111111 11111111 10000000 11111111 11111111 0 1
31.34 11111111 11111111 11000000 11111111 11111111 0 1
31.40 11111111 11111111 11100000 11111111 11111111 0 1
31.49 11111111 11111111 11110000 11111111 11111111 0 1
31.94 11111111 11111111 11111100 11111111 11111111 0 1
32.00 11111111 11111111 11111111 11111111 11111111 0 1
32.20 11111111 11111111 11111111 11111111 01111111 0 1
32.29 11111111 11111111 11111111 11111111 00111111 0 1
32.35 11111111 11111111 11111111 11111111 00011111 0 1
32.36 11111111 11111111 11111111 11111111 00001111 1 1
32.44 11111111 11111111 11111111 11111111 00000111 1 1
32.69 11111111 11111111 11111111 11111111 00000011 1 1
32.95 11111111 11111111 11111111 11111111 00000000 1 1
34.57 11111111 11111111 11111111 11111111 00000000 0 0
```

What is claimed is:

1. A pattern comparator comprising:
means for simultaneously comparing a serial input signal to at least one pattern data signal, the comparing means simultaneously outputting at least one accumulated distance signal representing an accumulated difference between said serial input signal and said at least one pattern data signal;
means for determining whether said at least one accumulated distance signal is an optimum value relative to a threshold, said determining means outputting a threshold win signal when said at least one accumulated distance signal is not equal to said threshold; and
means for storing said threshold, said storing means updating said threshold with said optimum value in response to said threshold win signal and when said at least one accumulated distance signal is an optimum value relative to said threshold.

2. A pattern comparator as recited in claim 1, wherein said determining means determines a minimum value as said optimum value, said storing means updating said threshold with said minimum value in response to said threshold win signal and when said at least one accumulated distance signal is less than said threshold.

3. A pattern comparator as recited in claim 2, wherein said determining means simultaneously determines said minimum value from at least one of a plurality of said accumulated distance signals and said threshold value, said determining means including means for identifying a winner from said plurality of said accumulated distance values and said threshold value, said winner corresponding to said minimum value.

4. A pattern comparator as recited in claim 2, wherein said determining means comprises:
first means for determining a relative minimum signal between said at least one accumulated distance signal and a feedback signal, said determining means outputting a win signal when said at least one signal is output as said relative minimum signal;
second means for determining a relative minimum threshold signal between said threshold and said feedback signal simultaneously with said means for determining a relative minimum signal, said relative minimum threshold determining means outputting said threshold win signal when said threshold is output as said relative minimum signal;
means for generating said feedback signal in response to said relative minimum signal and said relative minimum threshold signal, said feedback signal generating means comparing corresponding significant bits of said relative minimum signal and said relative minimum threshold signal and outputting said feedback signal in response thereto.

5. A pattern comparator as recited in claim 1, wherein said means for comparing comprises at least one accumulator circuit comprising:
a distance determining circuit for determining a distance between said serial input signal and said corresponding at least one pattern data signal and outputting a distance signal representing said determined distance; and
means for accumulating said distance signal for a predetermined number of successive inputs of said serial input signal, said means for accumulating outputting said corresponding at least one accumulated distance signal.

6. A pattern comparator as recited in claim 5, wherein said means for accumulating comprises:
an adder circuit for adding said distance signal to a partial accumulated distance signal and for outputting an overflow signal and an addition result;
a register for storing said addition result as a partial updated accumulated distance signal, said register outputting said partial updated accumulated distance signal to said adder circuit as said partial accumulated distance signal; and
an array of ring counters outputting a counter signal, said counter signal being incremented by said array in response to said overflow signal, said counter signal and said partial accumulated distance signal output from said register forming said corresponding at least one accumulated distance signal.

7. A pattern comparator as recited in claim 1, wherein said means for determining comprises a multipath feedforward network for determining said optimum value.

8. A pattern comparator as recited in claim 7, wherein said multipath feedforward network comprises:
a first network layer comprising:
at least one primary neuron for simultaneously comparing corresponding significant bytes of said at least one accumulated distance signal and a feedback signal and outputting a corresponding first optimal comparison signal, said at least one primary neuron outputting an inverted WON signal when said corresponding first optimal comparison signal represents said at least one accumulated distance signal as an optimal value compared to said feedback signal, and
a primary threshold neuron for comparing, simultaneously with said at least one primary neuron, said corresponding significant bytes of said feedback signal and said threshold and outputting a first optimal threshold signal, said primary threshold neuron outputting said threshold win signal when said first optimal threshold signal represents said threshold as an optimal value compared to said feedback signal;
a second network layer comprising a NAND tree for determining different values for corresponding significant bits of said at least one corresponding first optimal comparison signal and said first optimal threshold signal, said NAND tree outputting said corresponding byte of said feedback signal representing a bit suppression signal, said feedback signal representing an inverse of said optimum value;
means for outputting said optimal value in response to said feedback signal; and
means for outputting a best match signal in response to said at least one inverted WON signal, said best match identifying said at least one pattern data signal as a best match to said serial input signal.

9. A pattern comparator as recited in claim 1, wherein said means for determining comprises a central processing unit for determining whether said at least one accumulated distance signal is said optimum value.

10. A pattern comparator as recited in claim 1, wherein said means for storing comprises a threshold register, said optimum value being latched by said threshold register in response to said threshold win signal.

11. A pattern comparator as recited in claim 1, wherein said optimum value is a minimum value.

12. A pattern comparator as recited in claim 1, wherein said optimum value is a maximum value.

13. A pattern comparator as recited in claim 1, wherein said optimal value is user-selectable as one of a minimum and maximum value.

14. A method of updating a threshold value in a pattern comparator comprising the steps of:
determining and outputting at least one accumulated distance signal representing an accumulated difference between a serial input signal input to said pattern comparator and at least one pattern data signal;
determining whether said at least one accumulated distance signal is an optimum value relative to a threshold stored in said pattern comparator; and
updating said threshold stored in said pattern comparator with said at least one accumulated distance signal if said at least one accumulated distance signal is said optimum value.

15. A pattern comparator comprising:
a pattern error accumulator for receiving input data representing a detected pattern and a plurality of pattern data representing a corresponding plurality of patterns, said pattern error accumulator simultaneously comparing said input data with each of said plurality of pattern data and outputting a plurality of distance signals corresponding to said plurality of pattern data, respectively;
means for simultaneously comparing said distance signals with a threshold value and outputting an optimum value signal relative to said threshold value, said simultaneously comparing means outputting a threshold win signal when said optimum value signal is an optimum value relative to said threshold value; and
means for storing said threshold, said storing means updating said threshold with said optimum value signal in response to said threshold win signal.

16. A pattern comparator as recited in claim 15, wherein said simultaneously comparing means determines a minimum value as said optimum value, said storing means updating said threshold with said minimum value when said minimum value is less than said threshold.

17. A pattern comparator as recited in claim 16, wherein said simultaneously comparing determining means simultaneously determines said minimum value from at least one of a plurality of said accumulated distance signals and said threshold value, said simultaneously comparing means including means for identifying a winner as said minimum value from said plurality of said accumulated distance values and said threshold value.

18. A pattern comparator as recited in claim 16, wherein said simultaneously comparing means comprises:
first means for determining a relative minimum signal between said distance signals and a feedback signal;
second means for determining a relative minimum threshold signal between said threshold and said feedback signal simultaneously with said first means, said second means outputting said threshold win signal when said threshold is output as said relative minimum threshold signal; and
means for generating said feedback signal in response to said relative minimum signal and said relative putting at least one accumulated distance signal representing an accumulated difference between said serial input signal and said at least one pattern data signal;

means for determining whether said at least one accumulated distance signal is an optimum value relative to a threshold and for outputting said optimum value, said determining means outputting a threshold win signal when said at least one accumulated distance signal is not equal to said threshold; and a memory for storing said threshold, said memory updating said threshold with said optimum value in response to said threshold win signal and when said at least one accumulated distance signal is an optimum value relative to said threshold.

32. A pattern comparator as recited in claim 31, wherein said determining means determines a minimum value as said optimum value, said memory updating said threshold with said minimum value in response to said threshold win signal and when said at least one accumulated distance signal is less than said threshold.

33. A pattern comparator as recited in claim 32, wherein said determining means simultaneously determines said minimum value from at least one of a plurality of said accumulated distance signals and said threshold value, said determining means including means for identifying a winner from said plurality of said accumulated distance values and said threshold value, said winner corresponding to said minimum value.

34. A pattern comparator as recited in claim 32, wherein said determining means comprises:

first means for determining a relative minimum signal between said at least one accumulated distance signal and a feedback signal;

second means for determining a relative minimum threshold signal between said threshold and said feedback signal simultaneously with said first means, said second means outputting said threshold win signal when said threshold is output as said relative minimum threshold signal; and means for generating said feedback signal in response to said relative minimum signal and said relative minimum threshold signal, said feedback signal generating means comparing corresponding significant bits of said relative minimum signal and said relative minimum threshold signal and outputting said feedback signal in response thereto.

35. A pattern comparator as recited in claim 31, wherein said means for comparing comprises at least one accumulator circuit comprising:

a distance determining circuit for determining a distance between said serial input signal and said corresponding at least one pattern data signal and outputting a distance signal representing said determined distance; and means for accumulating said distance signal for a predetermined number of successive inputs of said serial input signal, said means for accumulating outputting said corresponding at least one accumulated distance signal.

36. A pattern comparator as recited in claim 35, wherein said means for accumulating comprises:

an adder circuit for adding said distance signal to a partial accumulated distance signal and for outputting an overflow signal and an addition result;

a register for storing said addition result as a partial updated accumulated distance signal, said register outputting said partial updated accumulated distance signal to said adder circuit as said partial accumulated distance signal; and an array of ring counters outputting a counter signal, said counter signal being incremented by said array in response to said overflow signal, said counter signal and said partial accumulated distance signal output from said register forming said corresponding at least one accumulated distance signal.

37. A pattern comparator as recited in claim 31, wherein said means for determining comprises a multipath feedforward network.

38. A pattern comparator as recited in claim 37, wherein said multipath feedforward network comprises:

a first network layer comprising:

at least one primary neuron for simultaneously comparing corresponding significant bytes of said at least one accumulated distance signal and a feedback signal and outputting a corresponding first optimal comparison signal, said at least one primary neuron outputting an inverted WON signal when said corresponding first optimal comparison signal represents said at least one accumulated distance signal as an optimal value compared to said feedback signal, and a primary threshold neuron for comparing, simultaneously with said at least one primary neuron, said corresponding significant bytes of said feedback signal and said threshold and outputting a first optimal threshold signal, said primary threshold neuron outputting said threshold win signal when said first optimal threshold signal represents said threshold as an optimal value compared to said feedback signal;

a second network layer comprising a NAND tree for determining different values for corresponding significant bits of said at least one corresponding first optimal comparison signal and said first optimal threshold signal, said NAND tree outputting said corresponding byte of said feedback signal representing a bit suppression signal, said feedback signal representing an inverse of said optimum value;

means for outputting said optimal value in response to said feedback signal; and means for outputting a best match signal in response to said at least one inverted WON signal, said best match identifying said at least one pattern data signal as a best match to said serial input signal.

39. A pattern comparator as recited in claim 31, wherein said means for determining comprises a central processing unit.

40. A pattern comparator as recited in claim 31, wherein said optimum value is a minimum value.

41. A pattern comparator as recited in claim 31, wherein said optimum value is a maximum value.

42. A method of updating a threshold value in a pattern comparator comprising the steps of:

simultaneously inputting a serial input signal and a plurality of pattern data signals to said pattern comparator and causing said pattern comparator to simultaneously generate a partial distance signal for each of said plurality of pattern data signals, said partial distance signal representing a distance between said serial input signal and said respective pattern data signal;

causing said pattern comparator to accumulate said partial distance signal for a predetermined number of successive inputs of said serial input signal to obtain an accumulated distance signal;

causing said pattern comparator to simultaneously output said accumulated distance signal for each of said pattern data signals;

simultaneously comparing said plurality of accumulated distance signals and a threshold stored in said pattern comparator to determine whether any of said accumulated distance signals is selected as an optimum value relative to said threshold; and updating said threshold stored in said pattern comparator with said selected accumulated distance signal if said selected accumulated distance signal is said optimum value.

43. A pattern comparator that continually updates a threshold value, comprising:

a pattern error accumulator for receiving input data representing a detected pattern and a plurality of pattern data representing a corresponding plurality of patterns, said pattern error accumulator outputting a plurality of distance signals corresponding to said plurality of pattern data, respectively;

a feedforward network for simultaneously comparing said distance signals with a threshold signal representing a current threshold value, said feedforward network outputting an optimized value signal representing an optimized value from said comparison of said distance signals with said threshold signal, said feedforward network outputting a threshold win signal when said optimized value signal is an optimum value relative to said threshold signal; and a threshold logic circuit for outputting said threshold signal representing said current threshold value, said threshold logic circuit updating said current threshold value with said optimized value signal in response to threshold win signal.

44. A pattern comparator as recited in claim 43, wherein said input data and each of said pattern data each comprise a user-selectable bit-field.

45. A pattern comparator as recited in claim 43, wherein each of said distance signals represent an accumulated error between a predetermined number of successive samples of said input data and said corresponding pattern data.

46. A pattern comparator as recited in claim 43, wherein said pattern error accumulator simultaneously outputs a selected significant byte of each of said distance signals.

47. A pattern comparator as recited in claim 46, wherein said feedforward network simultaneously compares said selected significant bytes of said distance signals with a corresponding significant byte of said threshold signal, said feedforward network outputting a corresponding significant byte of said optimized value signal.

48. A pattern comparator as recited in claim 46, wherein said feedforward network simultaneously compares said selected significant bytes of said distance signals and said threshold signal with a corresponding significant byte of an external optimum distance value, said corresponding significant byte of said optimized value signal representing an optimized value from said comparison of said corresponding significant bytes of said distance signals with said threshold signal and said external optimum distance value.

49. A pattern comparator as recited in claim 43, wherein said feedforward network simultaneously compares said distance signals and said threshold signal with a an external optimum distance value, said optimized value signal representing an optimized value from said comparison of said distance signals with said threshold signal and said external optimum distance value.

50. A pattern comparator as recited in claim 43, wherein said feedforward network comprises:

a first network layer comprising:

a plurality of primary neurons for simultaneously comparing corresponding significant bytes of said respective distance signals with a feedback signal and outputting first optimal comparison signals, respectively, at least one of said primary neurons outputting an inverted WON signal when said respective first optimal comparison signal is an optimal value compared to said feedback signal, and a primary threshold neuron for comparing, simultaneously with said plurality of primary neurons, said corresponding significant bytes of said feedback signal and said threshold and outputting a first optimal threshold signal, said primary threshold neuron outputting said threshold win signal when said first optimal threshold signal is an optimal value compared to said feedback signal;

a second network layer comprising a NAND tree for determining different values for corresponding significant bits of said first optimal comparison signals and said first optimal threshold signal, said NAND tree outputting said corresponding byte of said feedback signal representing a bit suppression signal, said feedback signal representing an inverse of said optimum value;

means for outputting said optimal value in response to said feedback signal; and means for outputting a best match signal in response to said at least one inverted WON signal, said best match identifying said at least one pattern data signal as a best match to said serial input signal.

51. A pattern comparator that continually updates a threshold value, comprising:

a pattern error accumulator for receiving input data representing a detected pattern and a plurality of pattern data representing a corresponding plurality of patterns, said pattern error accumulator simultaneously comparing said input data with each of said plurality of pattern data and outputting a plurality of distance signals corresponding to said plurality of pattern data, respectively;

a feedforward network for simultaneously comparing said distance signals with a threshold signal representing a current threshold value and an external input signal, said feedforward network outputting an optimized value signal representing an optimized value from said comparison of said distance signals with said threshold signal and said external input signal, said feedforward network outputting a threshold win signal when said threshold signal is not an optimum value relative to said distance signals and said external input signal;

an expansion bus interface for outputting said optimized value signal onto an expansion bus adapted to connect said pattern comparator to other pattern comparators, said expansion bus interface reading from said expansion bus an optimum value relative to said optimized value signal and said other pattern comparators, said expansion bus interface outputting said external input signal representing said optimum value read from said expansion bus; and a threshold logic circuit for outputting said threshold signal representing said current threshold value, said threshold logic circuit updating said current threshold value with said external input signal in response to said threshold win signal.

52. A pattern comparator as recited in claim 51, wherein said input data and each of said pattern data each comprise a user-selectable bit-field.

53. A pattern comparator as recited in claim 52, wherein each of said distance signals represent an accumulated error between a predetermined number of successive samples of said input data and said corresponding pattern data.

54. A pattern comparator as recited in claim 53, wherein said pattern error accumulator simultaneously outputs a selected significant byte of each of said distance signals.

55. A pattern comparator as recited in claim 54, wherein said feedforward network simultaneously compares said selected significant bytes of said distance signals with a corresponding significant byte of said threshold signal, said feedforward network outputting a corresponding significant byte of said optimized value signal.

* * * * *